Oct. 23, 1956 A. T. POPE 2,768,022
COLLAPSIBLE LEAF BASKET AND BURNER FOR
ATTACHMENT TO WHEELBARROWS
Filed Oct. 8, 1953
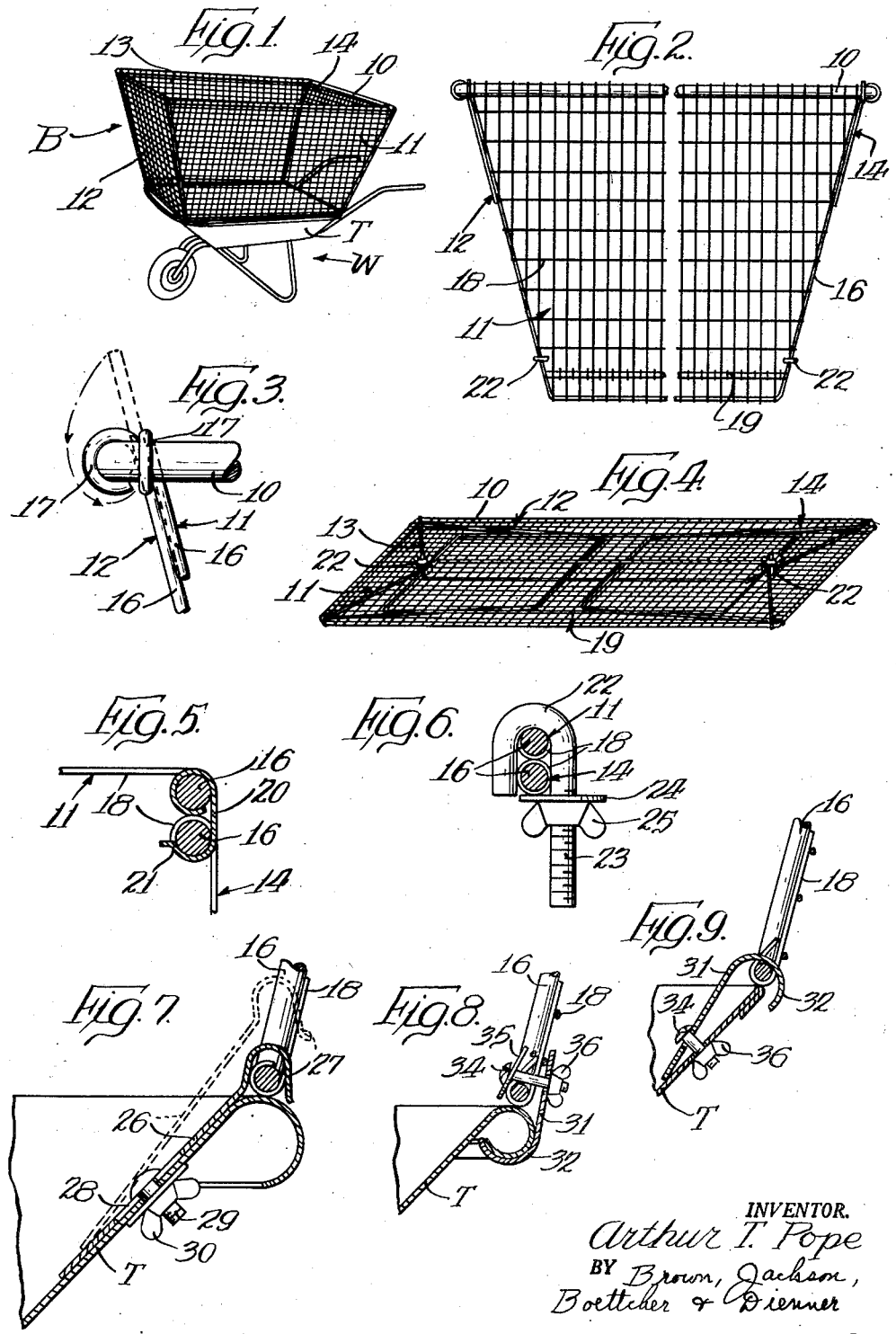
INVENTOR.
Arthur T. Pope
BY Brown, Jackson,
Boettcher & Dienner
Attys.

United States Patent Office 2,768,022
Patented Oct. 23, 1956

2,768,022

COLLAPSIBLE LEAF BASKET AND BURNER FOR ATTACHMENT TO WHEELBARROWS

Arthur T. Pope, Lake Forest, Ill.

Application October 8, 1953, Serial No. 384,913

7 Claims. (Cl. 296—27)

The present invention relates to a collapsible basket for attachment to a wheelbarrow for garden use to serve as a receptacle for the collection and burning of leaves, weeds and the like.

To substantially all householders, it is essential at certain times of the year, to have a convenient receptacle for the collection of leaves, weeds, and other rubbish or trash in and about their yards and gardens, and to have an incinerator for the disposal of this rubbish. However, for the majority of the year, the receptacle and incinerator are not put to use and must be stored some place. This poses the problem of wasting valuable space for the storage of two bulky items for the major portion of the year, or attempting to get by without the items at the times of the year when they are so necessary.

It is an object of the present invention to solve and eliminate this problem by providing a basket that will serve both as a collection receptacle and a burner or incinerator, and that when not in use may be collapsed to a very conveniently stored compact item.

Another object of the invention is to provide a collapsible basket of the nature stated that may be secured to a conventional garden wheelbarrow, whereby mobility and convenience of handling in use are assured.

Still another object of the invention is the provision of a collapsible leaf basket and burner of the character defined including a removable bottom wall constituting a grate, spaced from the tray of the wheelbarrow, upon which leaves and other rubbish may be burned, while in the basket, without damage to the wheelbarrow and with adequate draft and air to support combustion.

In accordance with the foregoing objects of the invention, I provide a collapsible basket comprising a polygonal top frame, and wire mesh side walls pivotally supported, respectively, on each of the sides of the top frame and swingable on the same from an extended position, wherein the sides define a generally box-like receptacle, to a collapsed position, wherein the sides lie flat against one another within the marginal confines of the frame to define a thin package that may readily be stored away, as by hanging the same on the wall of the garage, for example. In such assembly, a wire mesh bottom wall or burner grate may suitably be associated with the extended basket by dropping the same into the lower end thereof, and with the collapsed basket by disposing the same between two of the folded down side walls.

An additional object of the invention is to provide a collapsible basket as above defined wherein the top frame is rectangular and the side walls are four in number and each of generally trapezoidal outline with the widest portion thereof pivoted to the top frame, whereby the basket in its extended position simulates an inverted, truncated rectangular pyramid. This relationship affords the advantages, first, that the basket will have a large open top, second, that use of the same even with a small wheelbarrow will afford a substantial volumetric capacity for leaves and the like and, third, that the removable bottom wall or grate may very readily be associated with the basket.

A further object of the invention is the provision of novel securing or clip means cooperable with the edges of adjacent basket sides to secure the sides in both the extended and collapsed positions thereof.

A still further object of the invention is the provision of novel clamp means for securing the basket to the tray of a wheelbarrow.

Other objects and advantages of the present invention will become apparent in the following detailed description of a preferred embodiment of the invention.

Now, in order to acquaint those skilled in the art with the manner of making and using the collapsible basket and burner of my invention, I shall describe, in connection with the accompanying drawings, a preferred embodiment of the invention.

In the drawings:

Figure 1 is a perspective view of the basket of my invention in its extended position and attached to a conventional wheelbarrow;

Figure 2 is a fragmentary side elevation, on an enlarged scale, of the basket as extended for use;

Figure 3 is a detail view, on a further enlarged scale, of one corner of the basket;

Figure 4 is a perspective view of the basket in its collapsed position;

Figure 5 is a cross sectional view of one corner of the basket in its extended position showing one embodiment of securing or clip means for attaching adjacent side walls of the basket together;

Figure 6 is a view similar to Figure 5 of a second embodiment of the securing or clip means;

Figure 7 is a fragmentary cross sectional view of a wheelbarrow tray and the basket of the invention showing one embodiment of clamp means for attaching the basket to the wheelbarrow tray;

Figure 8 is a view similar to Figure 7 of a second embodiment of the clamp means, the view showing the clamp means in one position of use; and Figure 9 is a view similar to Figure 8 showing the clamp means of that figure in a second position of use.

Referring to the drawings, I have shown in Figure 1 the leaf basket and burner B of my invention in its extended position as associated for use with the tray T of a conventional wheelbarrow W. As shown in Figures 1 to 4, the basket B comprises a rigid polygonal, preferably rectangular, top frame 10 suitably formed of metal tubing, round bar stock, or the like. At each of the sides thereof, the frame 10 carries a perforate side wall member 11, 12, 13 and 14, respectively. Each side wall preferably comprises a three-sided or generally U-shaped rigid frame 16, suitably formed of the same material as the top frame 10, but preferably of a smaller size. The frame 16 is pivotally mounted on the respective side of the top frame 10 by bending the free end portions of the legs of the U of the frame 16 about the frame 10, as is clearly shown in Figure 3 and indicated at 17. As will be appreciated, the frame 16 may be disposed either inwardly or outwardly of the frame 10, but is preferably disposed inwardly thereof, with the bent portion 17 extending over and outwardly around the frame 10, as is shown in Figure 3. The three-sided frame 16 of each of the sides 11, 12, 13 and 14 serves as the support for a wire mesh wall portion 18, the wire mesh being stretched and mounted upon or secured to the respective frame. The wire mesh may be of any desired size, but is preferably relatively large to avoid excessive weight and to afford good air circulation. On the other hand, the mesh should not be so large as to accommodate escape of leaves, or to render the side walls weak structurally.

As thus assembled, the four side walls 11, 12, 13 and 14 are adapted to be pivoted on the frame 10 to the extended position shown in Figures 1 and 2 and to the collapsed position shown in Figure 4. In its extended position, as will be appreciated, the basket comprises a four-sided receptacle for the collection of leaves, weeds and other rubbish and trash. As thus far described, and in many instances in practical use, the tray T of the wheelbarrow serves as the bottom wall of the receptacle. In the collapsed position, the four walls are folded inwardly upon one another, as shown in Figure 4, within the marginal confines of the top frame 10, to constitute a thin rectangular package readily sored away, without loss of an appreciable amount of storage space.

While the side walls of the basket of the invention may be formed of a number of configurations, the simplest of which is rectangular, I prefer to employ side walls of generally trapezoidal form in outline, wherein the wide or base wall of the two parallel edges of the trapezoid is disposed adjacent the top frame 10 of the basket. By providing trapezoidal side walls, the basket is readily collapsed and extended, and in the extended position thereof forms an inverted truncated rectangular pyramid. As pointed out hereinbefore, such relation assures a large open top for the basket and also assures a substantial volumetric capacity even when the basket is mounted on a relatively small wheelbarrow. When mounted on a wheelbarrow, the basket is readily moved from place to place and is conveniently used. Due to its structure, the basket is light weight, readily collapsed or extended, and readily carried about in either position.

Many gardeners prefer to form composts of leaves collected in their yards and gardens. Such gardeners are not interested in burning the leaves and thus may use the basket of the invention in the manner thus far described. As will become apparent hereinafter, the basket in use is clipped together in a manner to be rigid and is fixedly secured to a wheelbarrow so that leaves collected therein may readily be dumped onto a compost pile by inverting the wheelbarrow, thereby affording optimum mobility for the gardener. On the other hand, some gardeners prefer not to form composts for various reasons and prefer to rid themselves of leaves and other rubbish by burning the same. For these gardeners, it is preferable to provide a bottom for the basket so that leaves burned therein will not be burned directly on the tray of the wheelbarrow and will be supported in such manner as to insure proper draft and to afford adequate air to support a complete combustion of the leaves. To this end, I provide a bottom wall 19 for the basket comprising a polygonal, preferably rectangular, frame of the same configuration as the top frame 10, and a wire mesh wall stretched and mounted on the frame, much like the side walls 11, 12, 13 and 14. The bottom wall 19 is preferably of a size smaller than the top frame 10 of the basket and of a size slightly larger than the open bottom of the basket, so that the bottom wall may rest on the side walls adjacent the bottom thereof as is shown in Figure 2. In such position, the bottom wall 19, in use of the basket, will be spaced from the tray T of the wheelbarrow to comprise a grate on which leaves and other rubbish may be efficiently burned without damage to the wheelbarrow. The preferred side wall structure described hereinbefore is particularly advantageous as regards the grate, since the relation is such as to provide inwardly inclined walls upon which the bottom wall may be rested without danger of the same falling into the wheelbarrow tray. As will be appreciated from the foregoing, the grate or bottom wall 19 may or may not be provided as a component of the complete basket assembly, depending upon the desires of the particular gardener purchasing the basket.

In the collapsed position of the basket of the present invention, the bottom wall or grate 19 is readily stored by disposing the same between two of the side walls 11, 12, 13 and 14 of the basket, as is shown in Figure 4. In the collapsed position of the basket, it is preferred, as will become more fully apparent hereafter, to tie, or otherwise secure, the side walls of the basket together. When the side walls are thus secured, it will be appreciated that the bottom wall or grate 19 is associated with the rigid top frame of the basket for storage therewith.

To retain the side walls of the basket in their extended position of use, and also to retain the side walls in the collapsed position thereof as described above, securing or clip means are provided at each corner of the basket for association with adjacent sides to secure or clip the sides together. In the collapsed position, the securing or clip means are adapted to be associated with the frames of two sides of the basket, or with the frame of one side and the wire mesh of another side, or with the wire mesh of two sides, to hold the basket in its collapsed position. In the extended position, the clips are preferably associated with the frames 16 of adjacent side walls. One embodiment of such securing or clip means is shown in Figure 5 as comprising a spring metal clip 20, suitably formed of a relatively thin strap, having one end thereof curved about the side portion of the frame 16 of one side of the basket so as to be pivotally mounted thereon and being formed at its opposite end to present an arcuate clip portion 21 adapted for the detachable reception of the side portion of the frame 16 of an adjacent side of the basket, when the said side portions of the two frames are disposed adjacent and substantially parallel to one another in the extended position of the basket. At least one such clip is provided at each corner of the basket, when the same is extended, adjacent the lower end of the basket, to lock the side walls 11, 12, 13 and 14 in their extended positions. To collapse the basket, it is merely necessary to detach the arcuate portion 21 of the various clips from the associated frame 16 and to swing the four side walls into their collapsed positions. The four side walls may also be locked in their collapsed position by utilization of the clips 20 to secure the side wall or frame with which the clip is permanently associated to a portion of an adjacent side wall. By proper manipulation of the clips, all four sides of the basket will be clipped together to retain the same in their flat position. In the collapsed or flat position, the bottom wall or grate 19 of the basket may be suitably confined between any two adjacent side walls of the basket, as is shown in Figure 4.

A second embodiment of the securing or clip means of the present invention is shown in Figure 6, and in Figures 2 and 4, as comprising a J-shaped bolt 22 having a threaded stem portion 23 adapted for the reception of a washer 24 and a nut 25. In use, when the sides of the basket are extended to dispose the side portions of the frames 16 of adjacent sides in substantially parallel engaging relation, the J-bolt is adapted to secure the sides in such position by disposition of the hook portion of the J around one frame 16, disposition of the washer 24 on the threaded stem portion 23 of the J-bolt and in engagement with the frame 16 of the other side of the basket, and securement of the J-bolt and washer in such position by tightening the nut 25 on the thread 23 of the bolt, as is shown in Figure 6. As will be appreciated, four J-bolts are provided for disposition at each corner of the extended basket and the same are adapted to be secured to the side walls adjacent the lower edge thereof, as is indicated in Figure 2. The J-bolts afford the particular advantage that the same accommodate adjustment of the side walls 11, 12, 13 and 14 to wheelbarrow trays of various sizes, as will be pointed out hereinafter, so that all four sides of the basket rest upon, or immediately adjacent to, the top edge or rim of the wheelbarrow tray. To collapse the assembly when the J-bolts are used, it is merely necessary to remove the four bolts from association with the basket, and then move the four side walls 11, 12, 13 and 14 to their collapsed positions. When in their collapsed positions, the side walls are suitably secured together by disposing the hook portion of one or more of the J-bolts about the frame 16 of one of the outwardly disposed side frames of the basket, extending the stem portion 23 thereof through the wire mesh of intervening walls, and disposing the washer 24 and nut 25 to the outer side of the other outwardly disposed side wall of the basket, as is shown in Figure 4. As will be appreciated, such securement of the basket in its collapsed position also accommodates disposition of the bottom wall or grate 19 of the basket in a position between two adjacent side walls of the collapsed basket.

In use, both of the securing or clip means described above serve to retain the basket in either its collapsed or extended position. In the extended position of the basket, the clip means serve to rigidify the basket so that the same, to all practical intents and purposes, constitute a basket of rigid integral construction. Accordingly, it will be appreciated that the basket may readily be moved about from place to place and subjected to quite severe usage without danger of the same being collapsed inadvertently or accidentally, or becoming irreparably damaged.

One particular advantage of the present invention resides in the adaptability of the basket to wheelbarrows of various sizes to afford mobility and ease of handling. Most up-to-date relatively inexpensive wheelbarrows intended for use in and around residences include a metal tray T. To secure the basket of the invention to such tray, special clamping means must be provided and I have shown two embodiments of suitable clamp means in Figures 7 to 9. In Figure 7, I have shown a first clamp comprising a metallic strap 26 including a flat body portion and a hooked end portion 27, the hook opening downwardly. The strap 26 is provided in the body portion thereof with an elongate hole or longitudinal slot 28 adapted for the passage of a bolt 29. To accommodate passage of the bolt, to secure the strap 26 to the wheelbarrow tray, a small hole is drilled through the tray T, and the bolt is secured to the tray by a wing nut 30. In use, when the extended basket is placed on the rim of the tray T, the wing nut 30 is loosened to accommodate sliding movement of the strap 26 upwardly and laterally of the tray to expose the hook portion 27 thereof for reception of the frame 16 of the adjacent side of the basket, as is shown in dotted lines in Figure 7. The strap is then moved downwardly, whereupon the hook portion 27 holds the frame 16 tightly on the rim of the wheelbarrow tray, and is secured in such position by tightening the nut 30. At least two such clamp means, and preferably four, are provided rigidly to connect the extended basket to the wheelbarrow.

The rim of the metal tray T of small garden wheelbarrows is either rolled, as shown in Figure 8, or folded flat as shown in Figure 9. A second embodiment of the clamp means of the invention, particularly adapted for use with either type of tray rim, is shown in the two figures as associated with both rim types. This clamp means, as in the embodiment of Figure 7, comprises a metallic strap 31 having a hooked portion 32 at one end thereof and a hole in the body thereof. When used with the tray having a rolled rim, there is no necessity for forming a hole in the tray since the hooked portion 32 may be disposed in engagement with the lower surface of the rim and the body portion may be associated with the adjacent side wall of the basket. Specifically, a bolt 34 passed through the hole in the strap 31 extends over the frame 16 of the adjacent wall of the basket and is secured thereto by a washer 35 and a nut 36. With the flat rim as shown in Figure 9, however, it is necessary that a hole be drilled in the wheelbarrow tray T, whereby the clamp assembly, indicated by numerals 31 to 36, is associated with the tray T and the adjacent side of the basket in much the same manner as is the assembly 26 to 30 previously described with respect to Figure 7.

Both embodiments of the clamp means of the invention insure rigid connection of the basket to the wheelbarrow tray whereby the basket is wheeled about as though an integral portion of the wheelbarrow. Thus, the basket is firmly supported by the wheelbarrow for the reception of leaves, weeds, trash and the like, for the burning of the same, and for the dumping of the leaves or the ashes thereof merely by inverting the wheelbarrow in a conventional manner.

With either of the clamp means described hereinbefore, and with the J-bolt clip means shown in Figure 6, the assembly and adjustment of the basket-burner to a wheelbarrow is readily accomplished. First, the basket is extended and the J-bolts utilized loosely to connect the side walls of the basket adjacent the lower edges thereof. Then, the basket is set on the wheelbarrow tray and the J-bolts are adjusted, by tightening or loosening the same, to accommodate adjustment of the side walls in such manner that the lower edge portion of the frame of each side rests on the adjacent portion of the rim of the wheelbarrow tray. Adjustment of the J-bolts will accommodate disposition of the side walls to define variations in the character of the lower portion of the receptacle from relatively long and narrow to relatively short and wide. Once the basket is adjusted to the particular wheelbarrow, the clamp means are secured in any one of the manners described to fix the basket to the wheelbarrow.

From the foregoing, it will be appreciated that the present invention provides a highly economical and practical leaf basket and burner that affords a large volume receptacle and burner or incinerator when such items are essential to the householder or gardener, and that is collapsed to a readily stored compact package when such items are not in demand by the householder. Also, the association of the basket in its extended position with a wheelbarrow affords a particularly advantageous mobility and ease of handling.

While I have described what I regard to be a preferred embodiment of my invention, it will be appreciated that various changes, rearrangements and modifications may be made therein without departing from the scope of the invention, as defined by the appended claims.

I claim:

1. A collapsible leaf basket and burner for attachment to wheelbarrows having a metal tray with a rolled rim, comprising a rectangular top frame, a wire mesh side wall member pivotally connected to each of the four sides of said top frame, said side walls being movable to an extended position wherein the same define a wire mesh receptacle for leaves and the like and to a collapsed position wherein the same lie upon one another within the marginal confines of said top frame, clip means associated with said side walls to retain the same in predetermined relation at least in the extended position thereof, and clamp means associated with the lower edge of at least some of said side wall members to secure the basket in the extended position thereof to the tray of the wheelbarrow, said clamp means each comprising a metal strap having a hooked end portion engageable with the rolled rim of the wheelbarrow tray and a body portion with a hole therein, and a bolt extending through the hole in said body portion and cooperable with the lower edge of the adjacent one of said side walls to secure said side walls to the rim of the wheelbarrow tray.

2. A collapsible leaf basket and burner for attachment to wheelbarrows having a tray, comprising a rectangular top frame, a wire mesh side wall member pivotally connected to each of the four sides of said top frame, said side walls being movable to an extended position wherein the same define a wire mesh receptable for leaves and the like and to a collapsed position wherein the same lie upon one another within the marginal confines of said top frame, clip means associated with said side walls to retain the same in predetermined relation at least in the extended position thereof, and clamp means associated with the lower edge of at least some of said side wall members to secure the basket in the extended position thereof to the tray of the wheelbarrow, said clamp means each comprising a metal strap having a hooked end portion engageable with the lower edge portion of one of said side walls and a body portion with a hole therein, and a bolt extending through the hole in said body portion and cooperable with a hole in the wheelbarrow tray to secure said side walls to the rim of the wheelbarrow tray.

3. A collapsible leaf basket and burner for attachment to wheelbarrows comprising a rigid rectangular top frame, a side wall member pivotally connected to each of the four sides of said top frame, each of said side wall members comprising a three-sided generally U-shaped frame having the free ends of the legs thereof pivoted to the respective side of said top frame and a wire mesh stretched and mounted upon said U-shaped frame, each of said side walls being of trapezoidal shape with the top and bottom edges thereof parallel and the top edge of a width greater than the bottom edge, said side walls being movable to an extended position wherein the legs of the U-shaped frames of adjacent side walls approximately engage one another to define a generally inverted truncated pyramidal receptacle and to a collapsed position wherein said side walls lie upon one another within the marginal confines of said top frame, clip means associated with the frames of said side walls to retain said side walls in both the extended and collapsed positions thereof, and clamp means associated with the bight portion of the U-shaped frames of at least some of said side walls, said clamp means being attachable to the tray of the wheelbarrow to secure the basket in the etxended position thereof to the wheelbarrow tray.

4. A collapsible leaf basket and burner as set forth in claim 3, wherein said clip means comprises a metallic clip pivotally mounted on one leg of a side wall frame at each corner of the basket, each clip including a portion cooperable with the adjacent leg of the adjacent side wall frame to secure said side walls together.

5. A collapsible leaf basket and burner as set forth in claim 3, wherein said clip means comprises a J-bolt having the hooked portion thereof detachably associated with one leg of a side wall frame at each corner of the basket and including a stem portion carrying means engageable with the adjacent leg of the adjacent side wall frame to secure said side walls together.

6. A collapsible leaf basket and burner as set forth in claim 3, wherein said clamp means includes a metal strap having a hooked end portion and a body portion having a hole therein with a bolt extending through the said hole, one of said portions being detachably associated with the frame of a side wall and the other portion being attachable to and detachable from the wheelbarrow tray.

7. A collapsible leaf basket and burner as set forth in claim 3, including a bottom wall, said bottom wall comprising a rectangular frame of a size smaller than said top frame and of a size larger than the rectangular opening defined at the lower edges of said side wall members in the extended position thereof, and a wire mesh stretched and mounted upon said frame, said bottom wall being insertable into the receptacle defined by said side walls in the extended position thereof through said top frame and being engageable with said side wall members adjacent the lower edges thereof, said bottom wall being spaced from the tray of the wheelbarrow to constitute a grate for the burning of leaves and the like in the basket, said bottom wall being removable from the basket to accommodate collapsing of the side walls thereof, and being storable in the collapsed position of said side walls between two adjacent side walls.

References Cited in the file of this patent

UNITED STATES PATENTS

| Number | Name | Date |
|---|---|---|
| 968,028 | Brown | Aug. 23, 1910 |
| 1,182,901 | Gillespie | May 16, 1916 |
| 1,338,125 | Dolen | Apr. 27, 1920 |
| 1,443,901 | Murray | Jan. 30, 1923 |
| 1,499,665 | Kaufman | July 1, 1924 |
| 1,536,470 | Bornside | May 5, 1925 |
| 1,549,116 | Hardesty | Aug. 11, 1925 |
| 1,601,657 | Thompson | Sept. 28, 1926 |
| 1,823,816 | Chittenden | Sept. 15, 1931 |
| 1,833,857 | Reese | Nov. 24, 1931 |
| 2,121,514 | Waterman | June 21, 1938 |
| 2,617,570 | Knight | Nov. 11, 1952 |